(12) United States Patent
Mestery et al.

(10) Patent No.: US 11,689,454 B2
(45) Date of Patent: Jun. 27, 2023

(54) DISTRIBUTED TENANT OVERLAY NETWORK WITH CENTRALIZED ROUTING CONTROL PLANE

(71) Applicant: Cisco Technology, Inc., San Jose, CA (US)

(72) Inventors: Kyle Andrew Donald Mestery, Woodbury, MN (US); Rahim Lalani, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 17/223,486

(22) Filed: Apr. 6, 2021

(65) Prior Publication Data

US 2022/0321468 A1 Oct. 6, 2022

(51) Int. Cl.
*H04L 45/00* (2022.01)
*H04L 45/02* (2022.01)
*H04L 45/24* (2022.01)
*H04L 45/42* (2022.01)

(52) U.S. Cl.
CPC ............ *H04L 45/566* (2013.01); *H04L 45/02* (2013.01); *H04L 45/22* (2013.01); *H04L 45/24* (2013.01); *H04L 45/42* (2013.01)

(58) Field of Classification Search
CPC ......... H04L 45/02; H04L 45/22; H04L 45/24; H04L 45/42; H04L 45/566
See application file for complete search history.

(56) References Cited

U.S. PATENT DOCUMENTS

| | | | |
|---|---|---|---|
| 11,252,079 B2* | 2/2022 | Michael | H04L 45/22 |
| 2013/0212243 A1 | 8/2013 | Thakkar et al. | |
| 2017/0272359 A1* | 9/2017 | Behringer | H04L 45/64 |
| 2017/0317919 A1* | 11/2017 | Fernando | H04L 41/40 |
| 2018/0159821 A1 | 6/2018 | Chanda et al. | |
| 2019/0158397 A1 | 5/2019 | Liu | |
| 2020/0021555 A1 | 1/2020 | Fernando et al. | |
| 2020/0106696 A1* | 4/2020 | Michael | H04L 45/586 |
| 2020/0259789 A1* | 8/2020 | Yang | G06F 9/45558 |
| 2020/0259923 A1 | 8/2020 | DeArment et al. | |
| 2020/0344147 A1* | 10/2020 | Pianigiani | H04L 45/56 |
| 2021/0029031 A1* | 1/2021 | Boutros | H04L 45/64 |
| 2022/0109693 A1* | 4/2022 | Mashargah | H04L 12/4641 |

* cited by examiner

*Primary Examiner* — Jeong S Park
(74) *Attorney, Agent, or Firm* — Lee & Hayes, P.C.

(57) ABSTRACT

Techniques for multi-tenant overlays with per-tenant distributed routing are described herein. The techniques may include provisioning an overlay network such that tenants hosted by a forwarding plane of the overlay network are each configured to forward routing protocol packets to a routing control plane of the overlay network and the routing control plane of the overlay network is configured to determine routing paths between each tenant and respective destinations. A routing protocol packet may be sent to the routing control plane by a first tenant. The routing protocol packet may include an indication of a destination that is served by the first tenant. Based on receiving the routing protocol packet, the routing control plane may determine one or more routing paths between the tenants and the destination. Additionally, an indication of the routing path may be sent to the tenants.

15 Claims, 9 Drawing Sheets

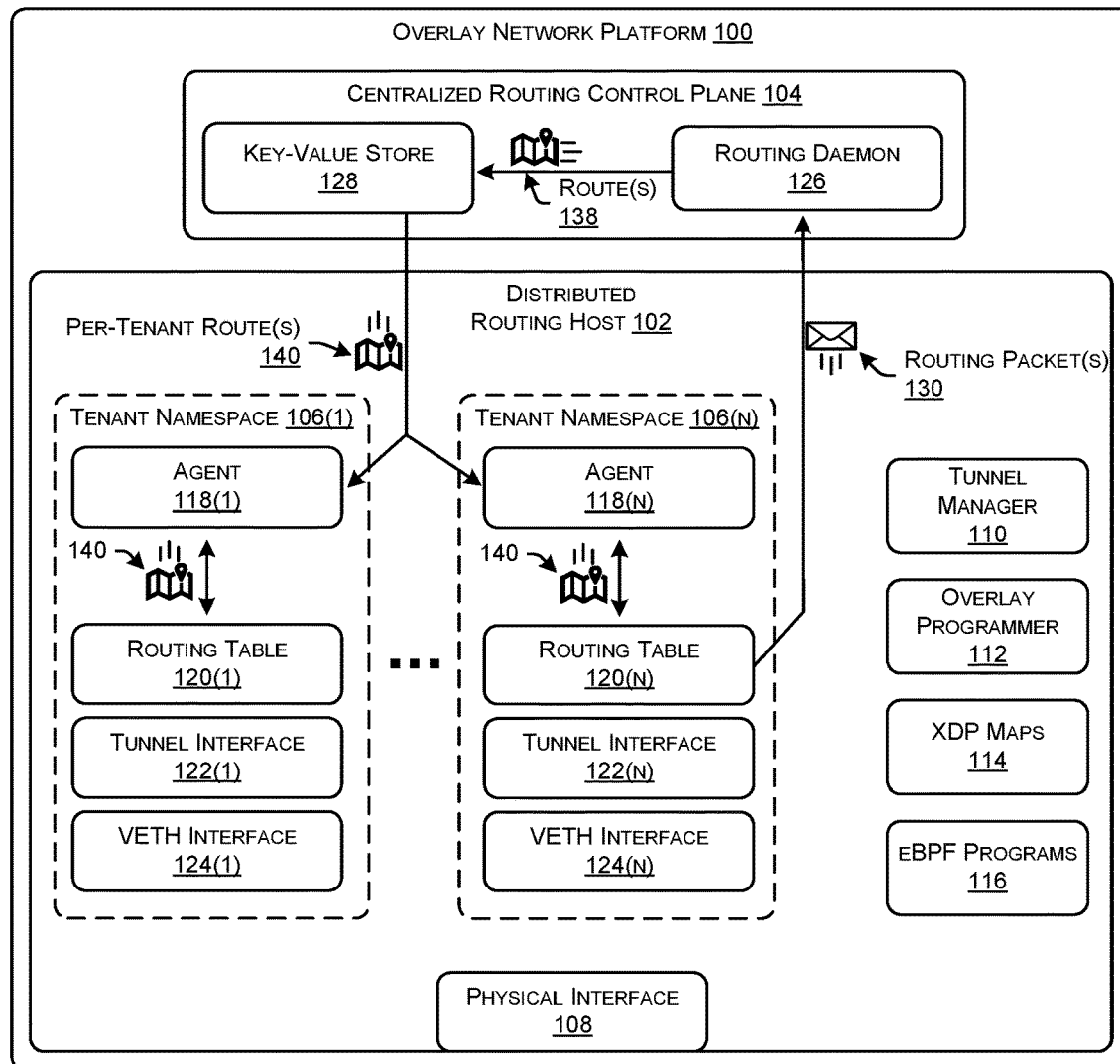
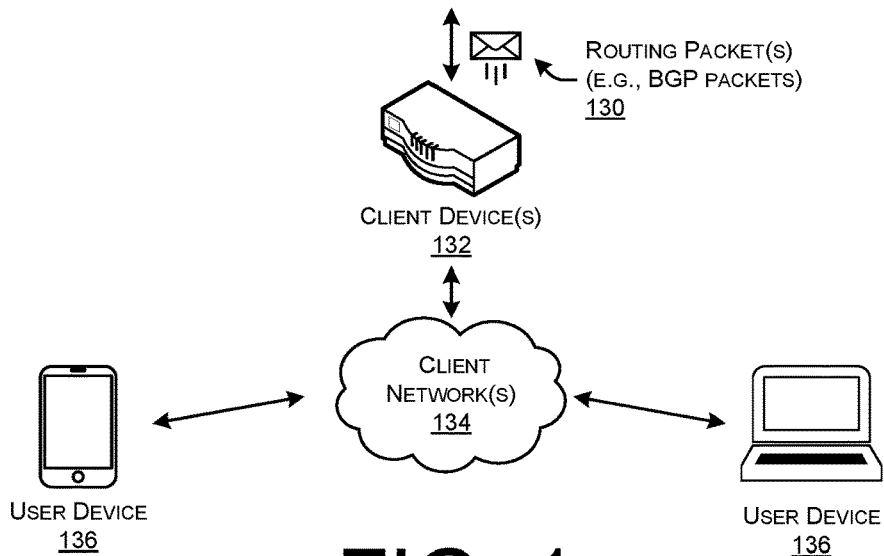
FIG. 1

600 ⟶

```
┌─────────────────────────────────────────────────────────────────┐
│ RECEIVE, AT A FIRST TENANT OF MULTIPLE TENANTS HOSTED BY A      │
│ FORWARDING PLANE OF AN OVERLAY NETWORK, A ROUTING PACKET        │
│ INCLUDING AN INDICATION OF A DESTINATION THAT IS SERVED BY THE  │
│ FIRST TENANT                                                    │
│ 602                                                             │
└─────────────────────────────────────────────────────────────────┘
                                  ↓
┌─────────────────────────────────────────────────────────────────┐
│ FORWARD THE ROUTING PACKET TO A ROUTING CONTROL PLANE OF THE    │
│ OVERLAY NETWORK BASED AT LEAST IN PART ON DETERMINING THAT THE  │
│ ROUTING PACKET INCLUDES THE INDICATION                          │
│ 604                                                             │
└─────────────────────────────────────────────────────────────────┘
                                  ↓
┌─────────────────────────────────────────────────────────────────┐
│ RECEIVE, AT A SECOND TENANT OF THE MULTIPLE TENANTS AND FROM THE│
│ ROUTING CONTROL PLANE, AN INDICATION THAT ONE OR MORE ROUTING   │
│ TABLES STORED BY THE ROUTING CONTROL PLANE HAVE BEEN UPDATED,   │
│ THE ROUTING TABLES INCLUDING A FIRST ROUTING TABLE THAT IS      │
│ ASSOCIATED WITH THE SECOND TENANT                               │
│ 606                                                             │
└─────────────────────────────────────────────────────────────────┘
                                  ↓
┌─────────────────────────────────────────────────────────────────┐
│ OBTAINING, FROM THE FIRST ROUTING TABLE STORED BY THE ROUTING   │
│ CONTROL PLANE, ROUTING DATA INDICATIVE OF AT LEAST A PORTION OF │
│ A ROUTING PATH BETWEEN THE SECOND TENANT AND THE DESTINATION    │
│ 608                                                             │
└─────────────────────────────────────────────────────────────────┘
```

702 RECEIVE, FROM A CLIENT DEVICE THAT IS ASSOCIATED WITH A FIRST NETWORK AND AT A REMOTE APPLICATION PROGRAMMING INTERFACE (API) THAT IS ASSOCIATED WITH A SECOND NETWORK, A REQUEST TO AUTHENTICATE AT LEAST ONE OF THE CLIENT DEVICE OR A USER ASSOCIATED WITH THE CLIENT DEVICE

704 DETERMINE, BY THE REMOTE API AND BASED AT LEAST IN PART ON THE REQUEST, WHETHER THE AT LEAST ONE OF THE CLIENT DEVICE OR THE USER IS AUTHORIZED TO ESTABLISH A SECURE COMMUNICATION CHANNEL WITH A HEADEND NODE OF THE SECOND NETWORK

706 EXCHANGE, BETWEEN THE CLIENT DEVICE AND THE REMOTE API, INFORMATION ASSOCIATED WITH ESTABLISHING THE SECURE COMMUNICATION CHANNEL BETWEEN THE CLIENT DEVICE AND THE HEADEND NODE, THE INFORMATION INCLUDING AT LEAST A FIRST KEY THAT IS ASSOCIATED WITH THE CLIENT DEVICE AND A SECOND KEY THAT IS ASSOCIATED WITH THE HEADEND NODE

708 BASED AT LEAST IN PART ON EXCHANGING THE INFORMATION, ESTABLISH THE SECURE COMMUNICATION CHANNEL BETWEEN THE CLIENT DEVICE AND THE HEADEND NODE

710 RECEIVE, FROM THE CLIENT DEVICE AND VIA THE SECURE COMMUNICATION CHANNEL, A FIRST INDICATION OF A FIRST ROUTE ASSOCIATED WITH A FIRST USER DEVICE OF THE FIRST NETWORK

FIG. 7

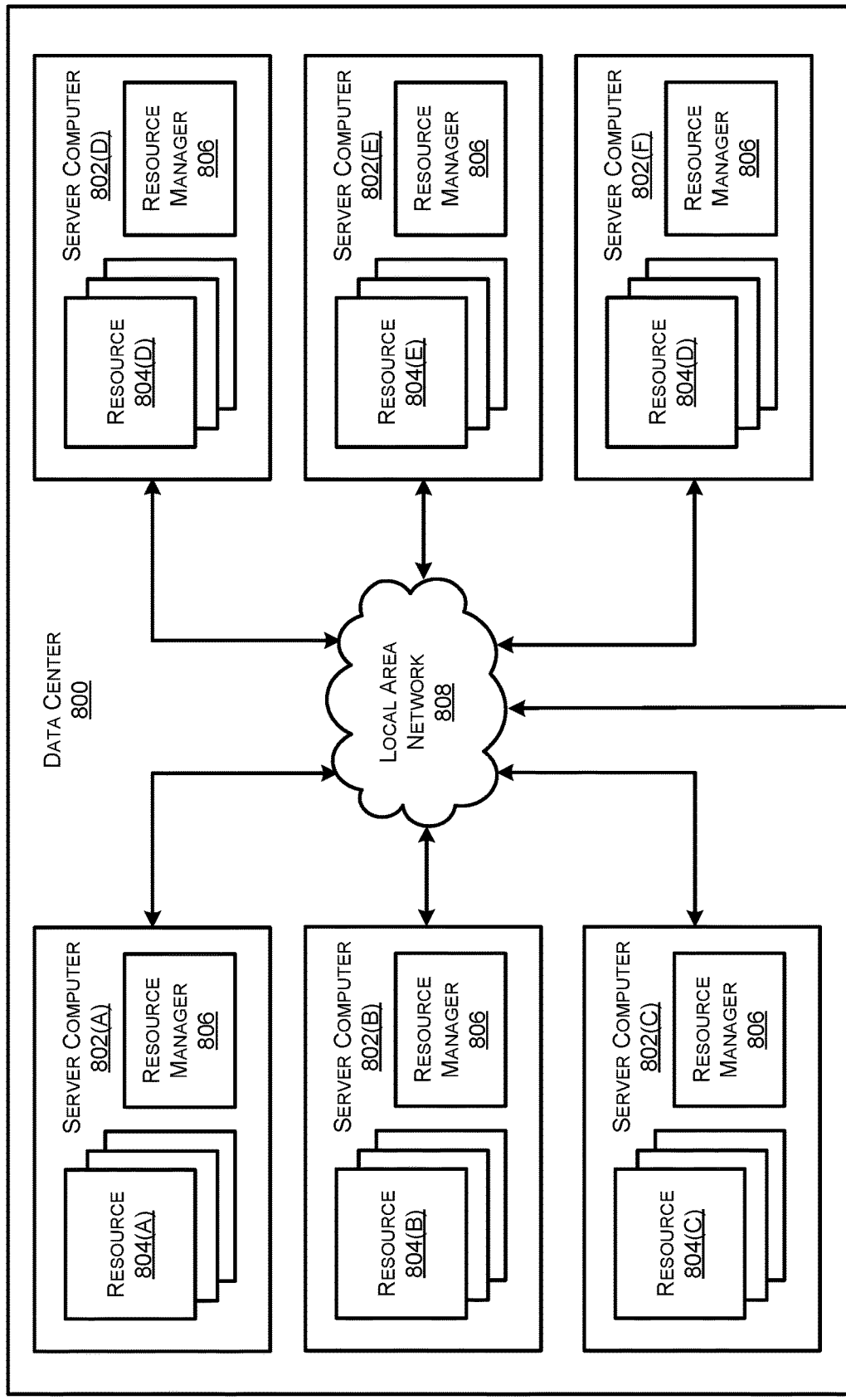

DISTRIBUTED TENANT OVERLAY NETWORK WITH CENTRALIZED ROUTING CONTROL PLANE

TECHNICAL FIELD

The present disclosure relates generally to a distributed tenant overlay network with a centralized routing control plane.

BACKGROUND

Traditional overlay networks generally do not scale as well when compared with routing planes used by tenants of these overlay networks. As such, building robust routing infrastructures using overlay networks tends to be challenging. Some of the challenges associated with building such infrastructures may include, among other things, managing routing tables for each tenant, as well as where to place/store them, where to handle calculating routes for each tenant, how to securely handle per-tenant routing information, adding security into the overlay network, and the like.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 is a system-architecture diagram illustrating an example overlay network platform including an example distributed routing host and an example centralized routing control plane.

FIG. 6 is a flow diagram illustrating an example method that may be performed at least partly by a forwarding plane of a distributed tenant overlay network.

FIG. 7 is a flow diagram illustrating an example method that may be performed at least partly by a remote application programming interface (API) to authenticate and establish a connection for a client device.

FIG. 8 is a computing system diagram illustrating an example configuration of a data center that can be utilized to implement aspects of the technologies disclosed herein.

DESCRIPTION OF EXAMPLE EMBODIMENTS

Overview

Figure 2:
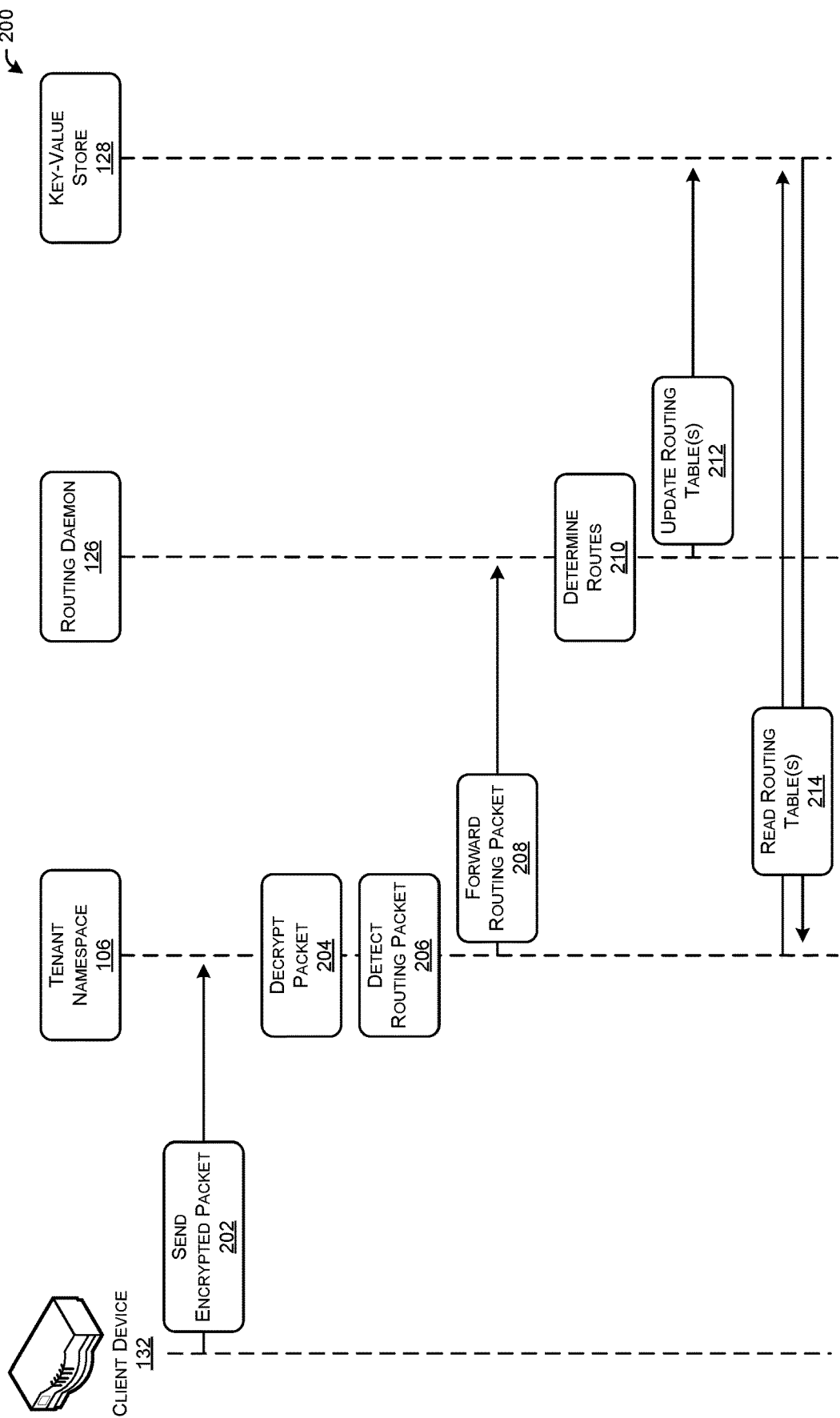
FIG. 2 is a data flow diagram illustrating an example traffic flow that may be performed at least partially by a distributed tenant overlay network as described herein.

This disclosure describes various techniques associated with provisioning a secure, multi-tenant overlay network in which traffic forwarding may be handled securely in a distributed data plane and routing logic may be handled in a centralized routing cluster of nodes. By way of example, and not limitation, a method according to the various techniques described in this disclosure may include provisioning an overlay network, wherein each tenant of multiple tenants hosted by a forwarding plane of the overlay network is configured to forward routing packets to a routing control plane of the overlay network. In some examples, the routing packets may indicate respective destinations that are served by each tenant. Additionally, the routing control plane of the overlay network may be configured to, based at least in part on receiving the routing packets, determine routing paths between each tenant of the multiple tenants and the respective destinations. The method may also include receiving a first routing packet at the routing control plane, the first routing packet sent to the routing control plane by a first tenant of the multiple tenants, the first routing packet including an indication of a first destination that is served by the first tenant. Based at least in part on the first routing packet, the routing control plane may determine a routing path between a second tenant of the multiple tenants and the first destination, generate routing data associated with the routing path, and store the routing data in a routing table that is associated with the second tenant and accessible to the second tenant.

In some examples, the method may additionally, or alternatively, include receiving, from a client device that is associated with a first network and at a remote application programming interface (API) that is associated with a second network, a request to establish a secure communication channel between the client device and a headend node of the second network. Based at least in part on the request, the remote API may determine whether the client device is authorized to establish the secure communication channel. The method may also include exchanging, between the client device and the remote API, information associated with establishing the secure communication channel between the client device and the headend node, the exchanged information including at least a first key that is associated with the client device and a second key that is associated with the headend node of the second network. Based at least in part on the exchanged information, the secure communication channel between the client device and the headend node may be established. Additionally, the method may include receiving, from the client device and via the secure communication channel, a first indication of a first route associated with a first user device of the first network.

The techniques described herein may additionally, or alternatively, be performed by a system and/or device having non-transitory computer-readable media storing computer-executable instructions that, when executed by one or more processors, performs the method described above.

Example Embodiments

As noted above, traditional overlay networks generally do not scale as well when compared with routing planes used by tenants of these overlay networks. As such, building robust routing infrastructures using overlay networks tends to be challenging. Some of the challenges associated with building such infrastructures may include, among other things, managing routing tables for each tenant, as well as where to place/store them, where to handle calculating routes for each tenant, how to securely handle per-tenant routing information, adding security into the overlay network, and the like.

In some cases, running per-tenant virtual routers is a possible solution. However, per-tenant virtual routers scale poorly, and operating per-tenant virtual routers can be inefficient as the operational cost is incredibly burdensome. Thus, trying to convert existing, physical routers into virtual formats and/or container formats is less than ideal. Instead, a way to securely distribute the overlays and the routing so that the operational cost can be aggregated across the number of tenants would be preferable.

Accordingly, this disclosure describes various techniques associated with provisioning a secure, multi-tenant overlay network in which traffic forwarding may be handled securely in a distributed data plane and routing logic may be handled in a centralized routing cluster of nodes, thus solving the problems noted above. That is, the techniques described herein may handle forwarding plane logic separately from control plane logic. For instance, routing decisions may be performed centrally by a routing control plane and the routes may then be distributed to the forwarding planes and handled in a distributed fashion using technology such as, for example, eXpress Data Path (XDP) and/or another extended Berkeley Packet Filter (eBPF)-based program. In some examples, XDP/eBPF may allow the forwarding plane to be stateless in terms of its operation, working on simple eBPF maps from the kernel. In at least one example, the techniques described herein may operate in a purely route based mode using eBPF maps, in which case a daemon operating on the centralized routing control plane may populate routing decisions into the maps. Alternatively, or additionally, the techniques described herein may operate in a route-based mode using a Linux namespace, in which per-namespace Linux forwarding databases may be populated and route decisions may be made using a Linux kernel. In the route-based mode using the Linux namespace, results of a lookup may be cached to improve performance, as calling from XDP code into the Linux kernel has a performance cost.

By way of example, and not limitation, a method according to the techniques described herein may include provisioning an overlay network, wherein each tenant of multiple tenants hosted by a forwarding plane of the overlay network is configured to forward routing packets (e.g., routing protocol packets, such as border gateway protocol (BGP) packets, for instance) to a routing control plane of the overlay network. In some examples, the routing packets may indicate respective destinations that are served by each tenant of the multiple tenants. For instance, a first routing packet may indicate one or more destinations (e.g., IP addresses, subnets, etc.) that are served by a client device (e.g., client router, edge node, etc.) that is associated with a first tenant. Additionally, in some examples, the overlay network may further be provisioned such that the routing control plane of the overlay network is configured to, based at least in part on receiving the routing packets, determine routing paths between each tenant of the multiple tenants and the respective destinations. For instance, the routing control plane may determine that traffic that is to be sent to a specific IP address or subnet must be sent to a specific tenant and/or specific client device.

In some examples, the method may include receiving, at a first tenant of the multiple tenants, a first routing packet including an indication of a first destination (e.g., first device, first IP address, first subnet, and/or the like) that is served by or otherwise associated with the first tenant. In other words, the first tenant may receive an indication of one or more routes (e.g., IP addresses, devices, subnets, etc.) of a network behind a client device that is associated with the first tenant.

In some examples, the method may include forwarding the first routing packet to the routing control plane. The first routing packet may include the indication of the first destination. In some instances, forwarding the first routing packet to the routing control plane may be based at least in part on determining that the routing packet includes the indication. For instance, the first tenant may detect or otherwise determine that the routing packet comprises, for example, a BGP packet or another routing protocol packet, and the first tenant may forward the routing packet to the routing control plane based at least in part on the routing packet comprising the BGP packet. In various examples, the first routing packet may be forwarded to a routing daemon of the routing control plane.

In some instances, after receiving the first routing packet from the first tenant, the routing control plane may determine a routing path between a second tenant of the multiple tenants and the first destination. For instance, the routing control plane may determine a routing path for the second tenant to send traffic to the first destination. In some examples, determining the routing path may be based at least in part on receiving the first routing packet. In various examples, the routing control plane may include a routing daemon that is configured to determine routing paths between tenants and destinations. As such, the routing daemon may determine the routing path between the second tenant and the first destination.

In various examples, the routing control plane may generate routing data that is indicative or otherwise associated with at least a portion of the routing path. Additionally, the routing control plane may store the routing data in a first routing table that is associated with the second tenant. For instance, the routing daemon of the routing control plane may generate the routing data and store the routing data in the first routing table. The routing table and/or the routing data may be stored at a location of the routing control plane that is accessible to the second tenant and/or accessible to an agent (e.g., key-value agent, consul agent, etc.) executing on the second tenant. For instance, the routing control plane may include a key-value store and/or cluster that stores multiple routing tables associated with respective tenants, and the key-value store may be readable by each of the tenants and/or agents executing on the tenants.

In some examples, the method may include receiving, at the second tenant and from the routing control plane, the routing data indicative of at least the portion of the routing path between the second tenant and the first destination. In at least one example, the second tenant may read the routing data from the first routing table. For instance, the second tenant or a key-value agent executing on the second tenant may determine that the first routing table and/or the key-value store has been updated and, in response, read the routing data from the first routing table. Additionally, based at least in part on receiving the routing data, the second tenant and/or the agent executing on the second tenant may update a second routing table to include the routing data. The second routing table may be stored locally by the second tenant in a memory associated with the second tenant.

In various examples, based at least in part on updating the second routing table to include the routing data, the second tenant may send traffic along the routing path and to the first destination. For instance, if traffic is to be sent to the first destination, the second tenant may access the routing data stored in the second routing table in order to determine the routing path for sending the traffic to the first destination.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a system-architecture diagram illustrating an example overlay network platform 100 including an example distributed routing host 102 and an example centralized routing control plane 104. The distributed routing host 102 may comprise or otherwise be configured as a forwarding plane of the overlay network platform 100. In this way, the centralized routing control plane 104 may handle routing logic on behalf of the distributed routing host 102 such that the distributed routing host 102 handles packet forwarding securely in the distributed data plane(s). Although depicted in FIG. 1 as having a single distributed routing host node 102 and a single centralized routing control plane node 104 for illustration purposes, it is contemplated that the overlay network platform 100 may include multiple distributed routing host nodes 102, as well as, in some examples, multiple centralized routing control plane nodes 104.

The distributed routing host 102 may host one or more tenant namespaces 106(1)-106(N) (hereinafter referred to collectively as "tenant namespaces 106) (where N represents any number greater than or equal to one). Additionally, the distributed routing host 102 may include a physical interface 108, a tunnel manager 110, an overlay programmer 112, one or more eXpress Data Path (XDP) maps 114, and one or more extended Berkeley Packet Filter (eBPF) programs 116. The tenant namespaces 106(1) and 106(N) may each include agents 118(1) and 118(N) (referred to collectively as "agents 118"), routing tables 120(1) and 120(N) (referred to collectively as "routing tables 120"), tunnel interfaces 122(1) and 122(N) (referred to collectively as "tunnel interfaces 122"), and virtual ethernet (VETH) interfaces 124(1) and 124(N) (referred to collectively as "VETH interfaces 124").

In some examples, the XDP map(s) 114 and/or the eBPF program(s) 116 may be attached to or otherwise accessible by the physical interface 108 of the distributed routing host 102. Additionally, in at least one example in which each namespace includes independent forwarding or routing tables 120, the XDP map(s) 114 and/or the eBPF program(s) 116 may be attached to or otherwise accessible by the VETH interfaces 124 of the tenant namespaces 106. In some instances, packets that are sent into the distributed routing host 102 may have an outer layer of encryption (e.g., Wireguard, IPsec, SSL, etc.), and this outer layer of encryption may be stripped off or otherwise decrypted after a packet enters one of the tenant namespaces 106. In this way, an overlay encapsulation (e.g., GENEVE, VXLAN, GUE, etc.) of the packet may be examined while the packet is in one of the tenant namespaces 106.

In some examples, the XDP map(s) 114 and/or the eBPF program(s) 116 may include code that configures the tenant namespaces 106 to detect when routing packets 130 (e.g., BGP packets) enter the tenant namespaces 106 so that those routing packets 130 may be forwarded to the centralized routing control plane 104. Once there, the centralized routing control plane may make routing decisions based on the received routing packets 130, and those routing decisions may be sent back to the distributed routing host 102 and/or the tenant namespaces 106. For instance, the centralized routing control plane 104 of the overlay network platform 100 may include a routing daemon 126 and a key-value store 128 (e.g., key-value cluster). In some examples, the routing daemon 126 may comprise one or multiple routing daemons. The routing daemon 126 may be configured to make the routing decisions, and the key-value store 128 may be configured to store routing tables and results of routing decisions.

By way of example, routing packets 130 may be sent to the overlay network platform 100 by one or more client devices 132. The routing packets 130 may be indicative of subnetwork routes that are served by the one or more client devices, such as the client network(s) 134 which includes the user devices 136. The user devices 136 may send traffic via the client network(s) 134 and to the client devices 132 such that the traffic may be routed to a destination (e.g., remote destination device, user device that is located in a remote office/network, and the like). The routing packets 130 may enter distributed routing host 102 of the overlay network platform 100 via the physical interface 108.

Based at least in part on a tenant overlay, the routing packets 130 may be sent into the tenant namespace 106(N) (e.g., sent into the VETH interface 124(N) of the tenant namespace 106(N)). In some examples, the routing packets 130 may be encapsulated according to a first encapsulation protocol (e.g., Wireguard, IPsec, SSL, etc.), and the routing packet 130 may be decapsulated in order for the tenant namespace 106(N) to detect that the packet is a routing packet 130 (e.g., a BGP packet). Based at least in part on detecting that the packet is a routing packet 130, the tenant namespace 106(N) (e.g., the tunnel interface 122(N) of the tenant namespace 106(N)) may forward the routing packet 130 to the routing daemon 126 of the centralized routing control plane 104.

Once the routing daemon 126 receives the routing packet 130, the routing daemon 126 may determine one or more route(s) 138 based on the routing packet 130. For instance, the routing packet 130 may include data indicating one or more routes of the client networks 134, one or more IP addresses associated with the user devices 136, and/or the like. In some examples, the routing daemon 126 may send or otherwise update the key-value store 128 with the route(s) 138. For instance, the key-value store 128 may store per-tenant routing tables, and the per-tenant routing tables may be updated to include the route(s) 138.

In some instances, the agents 118 of the tenant namespaces 106 may read the key-value store 128 to update their respective routing tables 120 with the per-tenant route(s) 140. For instance, the agent 118(1) may access the key-value store 128 to obtain the per tenant routes 140 that are associated with the tenant namespace 106(1) and update the routing table 120(1) to include the per-tenant routes 140. Likewise, the agent 118(N) may access the key-value store 128 to obtain the per tenant routes 140 that are associated with the tenant namespace 106(N) and update the routing table 120(N) to include the per-tenant routes 140. In this way, when subsequent packets are received in the tenant namespaces 106, the tenant namespaces 106 will know how to route the packet to a destination.

FIG. 2 is a data flow diagram illustrating an example traffic flow 200 that may be performed at least partially by a distributed tenant overlay network (e.g., the overlay network platform 100) as described herein. The data flow 200 may include one or more devices/components, such as the client device 132, the tenant namespace 106, the routing daemon 126, the key-value store 128, as well as other devices/components not shown.

At operation 202, the tenant namespace 106 may receive an encrypted packet from the client device 132. The packet may be encrypted according to a protocol such as Wireguard, IPsec, SSL, or the like. Additionally, the encrypted packet may be received using a VETH interface (e.g., VETH interface 124) or a tunnel interface (e.g., tunnel interface 122) of the tenant namespace 106.

At operation 204, the tenant namespace 106 may decrypt the packet to determine the packet's overlay. In some examples, the overlay protocol of the packet may comprise GENEVE, VXLAN, GUE, or another encapsulation protocol. At operation 206, the tenant namespace 106 may detect that the packet comprises a routing packet, such as a BGP packet or another routing protocol packet structure.

At operation 208, the tenant namespace 106 may forward the routing packet to the routing daemon 126. In some examples, forwarding the routing packet to the routing daemon 126 may be based at least in part on detecting the routing packet. For instance, the tenant namespace 106 may be configured to forward routing packets to the routing daemon 126 and/or the routing control plane whenever routing packets are detected. In some examples, the VETH interface or the tunnel interface of the tenant namespace 106 may forward the routing packets to the routing daemon 126.

At operation 210, the routing daemon 126 may determine one or more routes of a network served by the client device 132 and/or the tenant namespace. The routing daemon 126 may determine the one or more routes based at least in part on data included in the routing packet. For instance, the routing packet may include data indicating one or more routes of a client network served by the client device, one or more IP addresses associated with the user devices served by the client device, and/or the like.

At operation 212, the routing daemon 126 may update one or more routing tables stored by the key-value store 128. For instance, the key-value store 128 may store per-tenant routing tables associated with each tenant of a forwarding plane of a distributed tenant overlay network, and the routing daemon 126 may update some or all of those routing tables at operation 212.

Finally, at operation 214, the tenant namespace 106 may read its own respective routing table from the key-value store 128 in order to update its local routing forwarding information base (FIB) (e.g., routing table 120). In some examples, an agent executing on the tenant namespace, such as the agent 118, may read the routing table from the key-value store. In some examples, the tenant namespace 106 and/or the agent may receive an indication that the key-value store 128 has been updated and, in response, read the routing table. Additionally, or alternatively, the tenant namespace 106 and/or the agent may poll the key-value store 128 at set intervals (e.g., every second) to determine whether the key-value store 128 has been updated.

Figure 3:
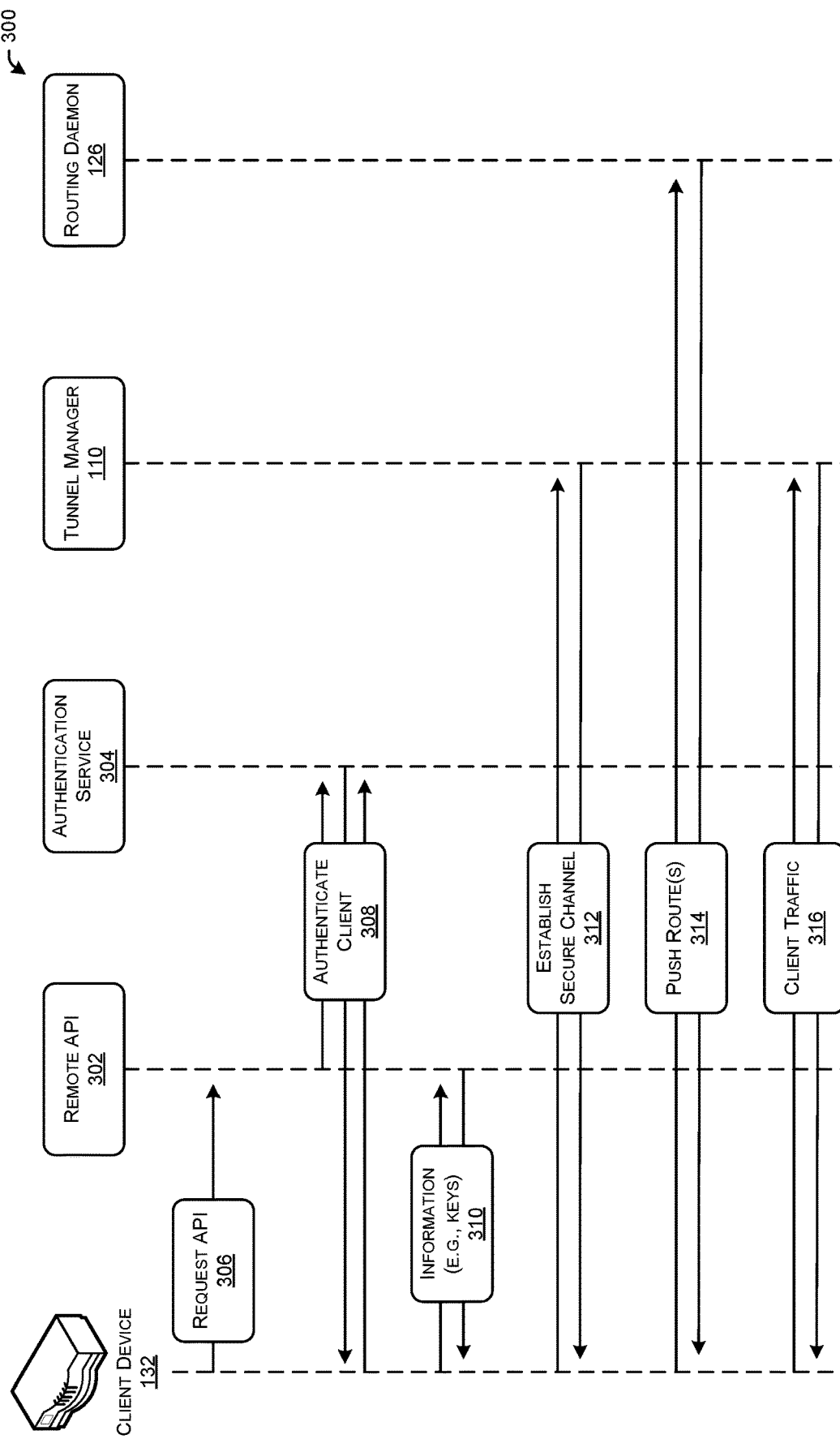
FIG. 3 is a data flow diagram illustrating another example traffic flow in which a client device authenticates and pushes routes to a distributed tenant overlay network.

FIG. 3 is a data flow diagram illustrating another example traffic flow 300 in which a client device 132 authenticates and pushes routes to a distributed tenant overlay network. As shown, the traffic flow 300 may include the client device 132, a remote application programming interface (API) 302, an authentication service 304, the tunnel manager 110, and the routing daemon 126, as well as other component and/or devices not shown. The remote API 302 and the authentication service 304 may be associated with the overlay network platform 100.

At operation 306, the client device 132 may send a request (e.g., an HTTPS API call) to the remote API 302 to authenticate the client device 132. Based on receiving the request, at operation 308 the remote API 302 may authenticate the client device 132 using the authentication service 304. For instance, the authentication service 304 may comprise an SSO service (e.g., DUO) or another type of authentication service and, based at least in part on the request, the remote API 302 may invoke the authentication service 304 to authenticate the client device 132 and/or the request.

At operation 310, the client device 132 and the remote API 302 may exchange information that is necessary to establish a secure channel (e.g., Wireguard tunnel, IPsec tunnel, SSL tunnel, etc.) between the client device 132 and the tunnel manager 110 (e.g., Wireguard headend, IPsec headend, SSL headend, etc.). As an example, the exchanged information may include, among other things, an IP address of the client device 132, a UDP port of the client device 132 that will be used for the secure channel, a public key (e.g., Wireguard public key) associated with the client device 132, an IP address of the tunnel manager 110, a UDP port of the tunnel manager 110 that will be used for the secure channel, and/or a public key associated with the tunnel manager 110. Based on the exchanged information, the client device 132 and the tunnel manager 110 may, at operation 312, establish the secure communication channel. For example, in the case of using the Wireguard protocol for the secure channel, Wireguard does not exchange public keys but, rather, assumes the public keys are already exchanged so that the secure channel (e.g., Wireguard tunnel) may be established. As such, by exchanging keys automatically via the remote API 302, a chain of trust may be established that allows the client device 132 to authenticate and exchange keys before the secure channel is brought up.

At operation 314, the client device 132 may push one or more routes to the routing daemon 126. In this way, the routing daemon 126 may update per-tenant routing tables for tenants of the distributed tenant overlay network. In some examples, pushing the routes to the routing daemon 126 may comprise sending routing protocol packets (e.g., BGP packets) to the routing daemon 126. The routing protocol packets may indicate one or more routes of a network that the client device 132 is serving. Additionally, the client device 132 may receive one or more routes or routing tables associated with other client devices and/or tenants of the distributed tenant overlay network. Finally, at operation 316, the client device 132 and the tunnel manager 110 may send traffic to one another using the secure channel.

Figure 4:
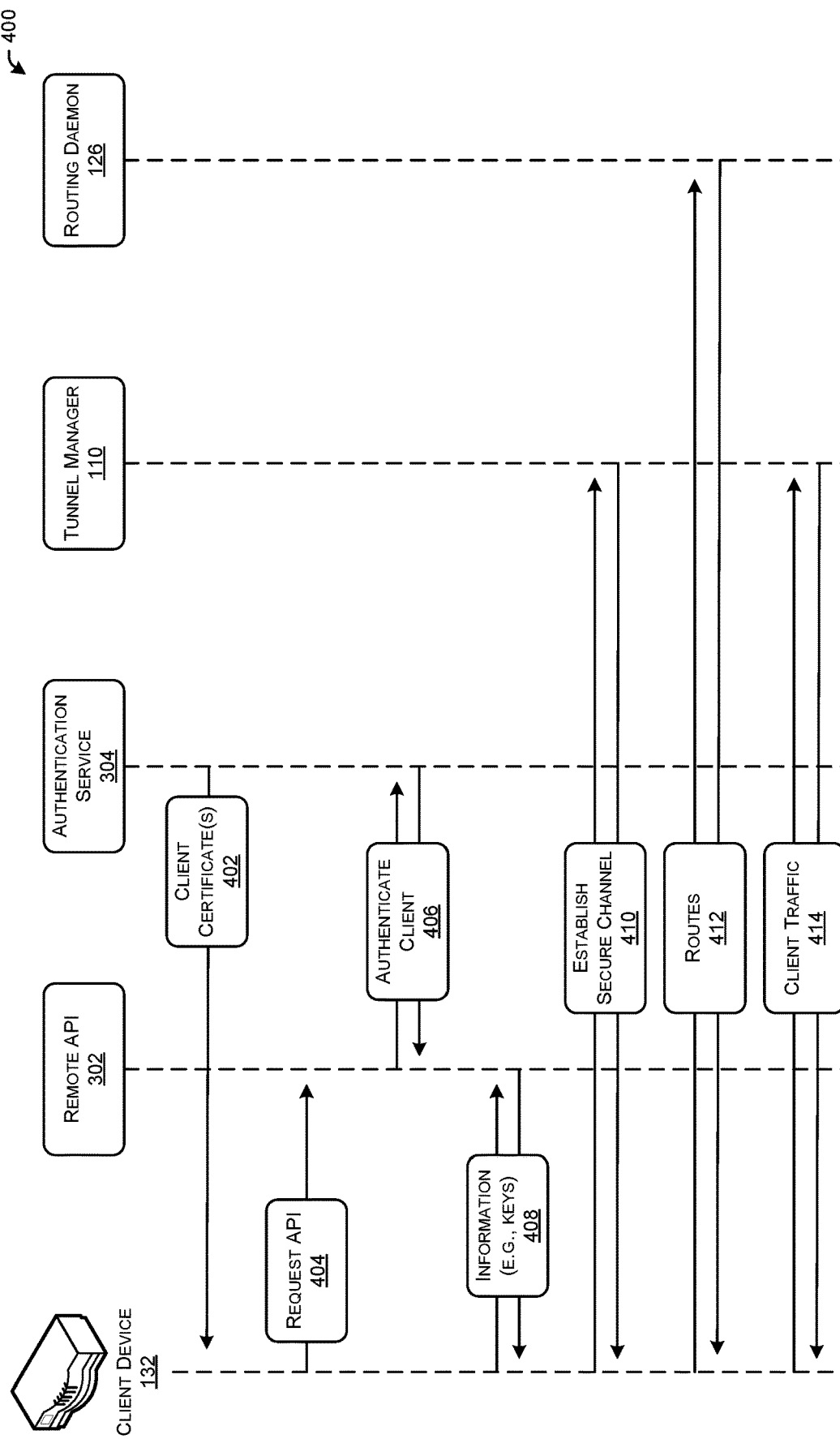
FIG. 4 is a data flow diagram illustrating yet another example traffic flow in which a client device uses a certificate-based authentication technique and pushes routes to a distributed tenant overlay network.

FIG. 4 is a data flow diagram illustrating yet another example traffic flow 400 in which a client device 132 uses a certificate-based authentication technique and pushes routes to a distributed tenant overlay network. As shown, the traffic flow 400 may include the client device 132, the remote application programming interface (API) 302, the authentication service 304, the tunnel manager 110, and the routing daemon 126, as well as other component and/or devices not shown.

At operation 402, the client device 132 may receive one or more certificates from the authentication service 304 that the client device 132 is to use while authenticating with the remote API 302. At 404, the client device 132 may send a request to the remote API 302 for the remote API 302 to authenticate at least one of the client device 132 or a request of the client device (e.g., a request to establish a secure channel). The request may include the one or more certificates.

Based on receiving the request, at operation 406 the remote API 302 may authenticate the client device 132 using the authentication service 304. For instance, the remote API 302 may present the one or more certificates to the authentication service 304 to authenticate the client device 132 and/or the request. At operation 408, after the client device 132 or the request is authenticated, the client device 132 and the remote API 302 may exchange information necessary to establish a secure channel (e.g., Wireguard tunnel, IPsec tunnel, SSL tunnel, etc.) between the client device 132 and the tunnel manager 110. For instance, the exchanged information may include, for instance, an IP address of the client device 132, a UDP port of the client device 132 that will be used for the secure channel, a public key (e.g., Wireguard public key) associated with the client device 132, an IP address of the tunnel manager 110, a UDP port of the tunnel manager 110 that will be used for the secure channel, and/or a public key associated with the tunnel manager 110. Based on the exchanged information, the client device 132 and the tunnel manager 110 may, at operation 410, establish the secure communication channel. For example, in the case of using the Wireguard protocol for the secure channel, Wireguard does not exchange public keys but, rather, assumes the public keys are already exchanged so that the secure channel (e.g., Wireguard tunnel) may be established. As such, by exchanging keys automatically via the remote API 302, a chain of trust may be established that allows the client device 132 to authenticate and exchange keys before the secure channel is brought up.

At operation 412, the client device 132 may push one or more routes to the routing daemon 126. In this way, the routing daemon 126 may update per-tenant routing tables for tenants of the distributed tenant overlay network. In some examples, pushing the routes to the routing daemon 126 may comprise sending routing protocol packets (e.g., BGP packets) to the routing daemon 126. The routing protocol packets may indicate one or more routes of a network that the client device 132 is serving. Additionally, the client device 132 may receive one or more routes or routing tables associated with other client devices and/or tenants of the distributed tenant overlay network. Finally, at operation 414, the client device 132 and the tunnel manager 110 may send traffic to one another using the secure channel.

Figure 5:
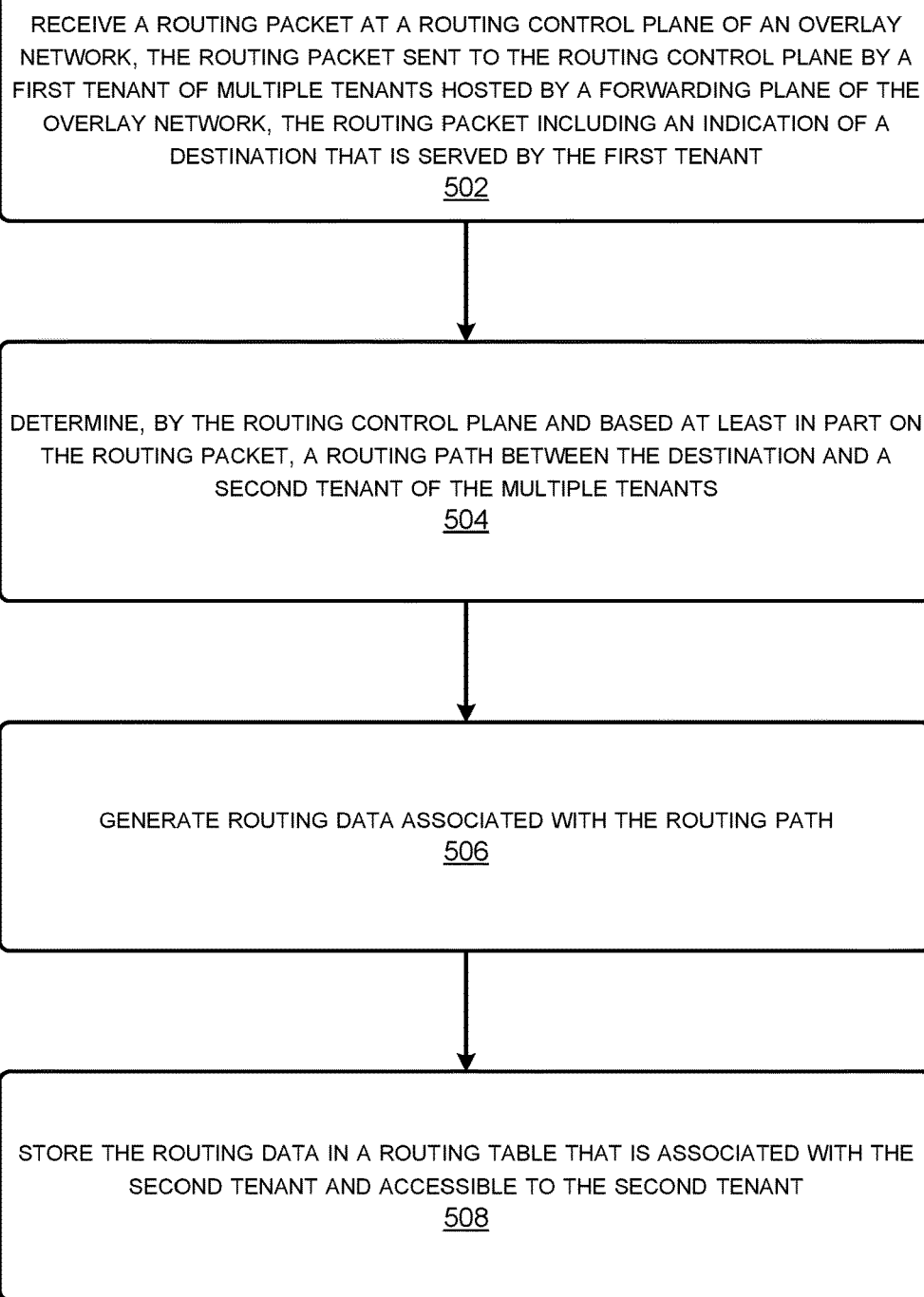
FIG. 5 is a flow diagram illustrating an example method that may be performed at least partly by a centralized routing control plane of a distributed tenant overlay network.

FIGS. 5-7 illustrate flow diagrams of example methods 500, 600, and 700 that illustrate aspects of the functions performed at least partly by the various nodes, device, and/or components described in FIGS. 1-4. The logical operations described herein with respect to FIGS. 5-7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5-7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 is a flow diagram illustrating an example method 500 that may be performed at least partly by a control plane (e.g., the centralized routing control plane 104) of a distributed tenant overlay network (e.g., overlay network platform 100). The method 500 begins at operation 502, which includes receiving a routing packet at a routing control plane of an overlay network, the routing packet sent to the routing control plane by a first tenant of multiple tenants hosted by a forwarding plane of the overlay network, the routing packet including an indication of a destination that is served by the first tenant. For instance, the routing daemon 126 of the centralized routing control plane 104 may receive the routing packet 130. Additionally, the routing packet 130 may have been sent to the centralized routing control plane 104 by the tenant namespace 106(N) hosted by the distributed routing host 102. Further, the routing packet 130 may indicate one or more routes associated with the client networks 134 served by the client device 132 and/or the tenant namespace 106(N).

At operation 504, the method 500 includes determining, by the routing control plane and based at least in part on the routing packet, a routing path between a second tenant of the multiple tenants and the first destination. For instance, the routing daemon 126 of the centralized routing control plane 104 may determine a routing path between the tenant namespace 106(1) and, for instance, the client device 132 and/or the user devices 136. At operation 506, the method 500 includes generating routing data associated with the routing path. For instance, the routing daemon 126 may generate and/or update a routing table to include routing data (e.g., IP mappings) associated with the routing path.

At operation 508, the method 500 includes storing the routing data in a routing table that is associated with the second tenant and accessible to the second tenant. For instance, the routing daemon 126 may store the routes 138 in the key-value store 128 of the centralized routing control plane. The key-value store 128 may be accessible to the tenant namespaces 106 and/or the agents 118 of the tenant namespaces 106. In this way, the tenant namespaces 106 may read the key-value store 128 to update their per-tenant routing tables 120 for routing subsequently received packets.

FIG. 6 is a flow diagram illustrating an example method 600 that may be performed at least partly by a forwarding plane (e.g., the distributed routing host 102) of a distributed tenant overlay network (e.g., the overlay network platform 100). The method 600 begins at operation 602, which includes receiving, at a first tenant of multiple tenants hosted by a forwarding plane of an overlay network, a routing packet including an indication of a destination that is served by the first tenant. For instance, the routing packet 130 (e.g., BGP packet) may be received by the tenant namespace 106(N) of the distributed routing host 102 of the overlay network platform 100. Additionally, the routing packet 130 may indicate one or more routes associated with the client networks 134 served by the client device 132 and/or the tenant namespace 106(N).

At operation 604, the method 600 includes forwarding the routing packet to a routing control plane of the overlay network based at least in part on determining that the routing packet includes the indication. For instance, the packet may be encapsulated/encrypted according to a specific encapsulation/encryption protocol (e.g., Wireguard, IPsec, SSL, etc.) and the tenant namespace 106(N) may decapsulate/decrypt the packet to determine that the packet is a routing protocol packet (e.g., BGP packet). Based at least in part on the packet being the routing protocol packet, the tenant namespace 106(N) may forward the routing packet 130 to the routing daemon 126 of the centralized routing control plane 104.

At operation 606, the method 600 includes receiving, at a second tenant of the multiple tenants and from the routing control plane, an indication that one or more routing tables stored by the routing control plane have been updated, the routing tables including a first routing table that is associated with the second tenant. For instance, the tenant namespace 106(1) may receive the indication that the one or more routing tables stored by the key-value store 128 have been updated.

At operation 608, the method 600 includes obtaining, from the first routing table stored by the routing control plane, routing data indicative of at least a portion of a routing path between the second tenant and the destination. For instance, the agent 118(1) of the tenant namespace 106(1) may obtain the routing data from the first routing table. The first routing table may be associated with the tenant namespace 106(1). Additionally, the agent 118(1) of the tenant namespace 106(1) may obtain the routing data from the key-value store 128.

FIG. 7 is a flow diagram illustrating an example method 700 that may be performed at least partly by a remote API (e.g., the remote API 302) to authenticate and establish a connection for a client device (e.g., the client device 132).

At operation 702, the method 700 begins by receiving, from a client device that is associated with a first network and at a remote API that is associated with a second network, a request to authenticate at least one of the client device or a user associated with the client device. In some examples, the request may be associated with establishing a secure communication channel (e.g., Wireguard tunnel, IPsec tunnel, SSL tunnel, etc.) between the client device and a headend node of the second network. For instance, the request may be received at the remote API 302 that is associated with the overlay network platform 100 and from the client device 132 that is associated with the client networks 134.

At operation 704, the method 700 includes determining, by the remote API and based at least in part on the request, whether the at least one of client device or the user is authorized to establish a secure communication channel with a headend node of the second network. For instance, the remote API 302 may utilize an authentication service 304 to determine whether the client device 132 or a user associated with the client device 132 is authorized to establish the secure channel. For instance, the remote API 302 may use one or more certificates received from the client device 132 to authenticate the client device 132. Additionally, or alternatively, the remote API 302 may invoke an SSO service (e.g., DUO, Citrix, Okta, etc.) to authenticate the client device 132.

At operation 706, the method 700 includes exchanging, between the client device and the remote API, information associated with establishing the secure communication channel between the client device and the headend node, the exchanged information including at least a first key that is associated with the client device and a second key that is associated with the headend node of the second network. For instance, the client device 132 and the remote API 302 may exchange Wireguard public keys. The client device 132 may provide its own key and the remote API 302 may provide a key of the tunnel manager 110 of the distributed routing host 102. Additionally, IP addresses and UDP ports associated with each of the client device and the headend node may be exchanged, in some instances.

At operation 708, the method 700 includes, based at least in part on exchanging the information, establishing the secure communication channel between the client device and the headend node. For instance, the client device 132 and the tunnel manager 110 may utilize the exchanged information to establish the secure communication channel.

At operation 710, the method 700 includes receiving, from the client device and via the secure communication channel, a first indication of a first route associated with a first user device of the first network. For instance, tenant namespace 106(N) may receive a routing packet 130 that indicates the first route and forward the routing packet 130 to the routing daemon 126. Additionally, the first route may be associated with one of the user devices 136 of the client networks 134.

FIG. 8 is a computing system diagram illustrating an example configuration of a data center 800 that can be utilized to implement aspects of the technologies disclosed herein. The example data center 800 shown in FIG. 8 includes several server computers 802A-802F (which might be referred to herein singularly as "a server computer 802" or in the plural as "the server computers 802") for providing computing resources. In some examples, the resources and/or server computers 802 may include, or correspond to, any type of networked device described herein. Although described as servers, the server computers 802 may comprise any type of networked device, such as servers, switches, routers, hubs, bridges, gateways, modems, repeaters, access points, etc.

The server computers 802 can be standard tower, rack-mount, or blade server computers configured appropriately for providing computing resources. In some examples, the server computers 802 may provide computing resources 804 including data processing resources such as VM instances or hardware computing systems, database clusters, computing clusters, storage clusters, data storage resources, database resources, networking resources, security, packet inspection, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 800 can also be configured to provide network services and other types of services.

In the example data center 800 shown in FIG. 8, an appropriate local area network (LAN) 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 800, between each of the server computers 802A-802F in each data center 800, and, potentially, between computing resources in each of the server computers 802. It should be appreciated that the configuration of the data center 800 described with reference to FIG. 8 is merely illustrative and that other implementations can be utilized. In some examples, the server computers 802 may each execute one or more application containers and/or virtual machines to perform techniques described herein.

In some instances, the data center 800 may provide computing resources, like application containers, VM instances, and storage, on a permanent or an as-needed basis. Among other types of functionality, the computing resources provided by a cloud computing network may be utilized to implement the various services and techniques described above. The computing resources 804 provided by the cloud computing network can include various types of computing resources, such as data processing resources like application containers and VM instances, data storage resources, networking resources, data communication resources, network services, and the like.

Each type of computing resource 804 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 804 not mentioned specifically herein.

The computing resources 804 provided by a cloud computing network may be enabled in one embodiment by one or more data centers 800 (which might be referred to herein singularly as "a data center 800" or in the plural as "the data centers 800"). The data centers 800 are facilities utilized to house and operate computer systems and associated components. The data centers 800 typically include redundant and backup power, communications, cooling, and security systems. The data centers 800 can also be located in geographically disparate locations. One illustrative embodiment for a data center 800 that can be utilized to implement the technologies disclosed herein will be described below with regard to FIG. 9.

Figure 9:
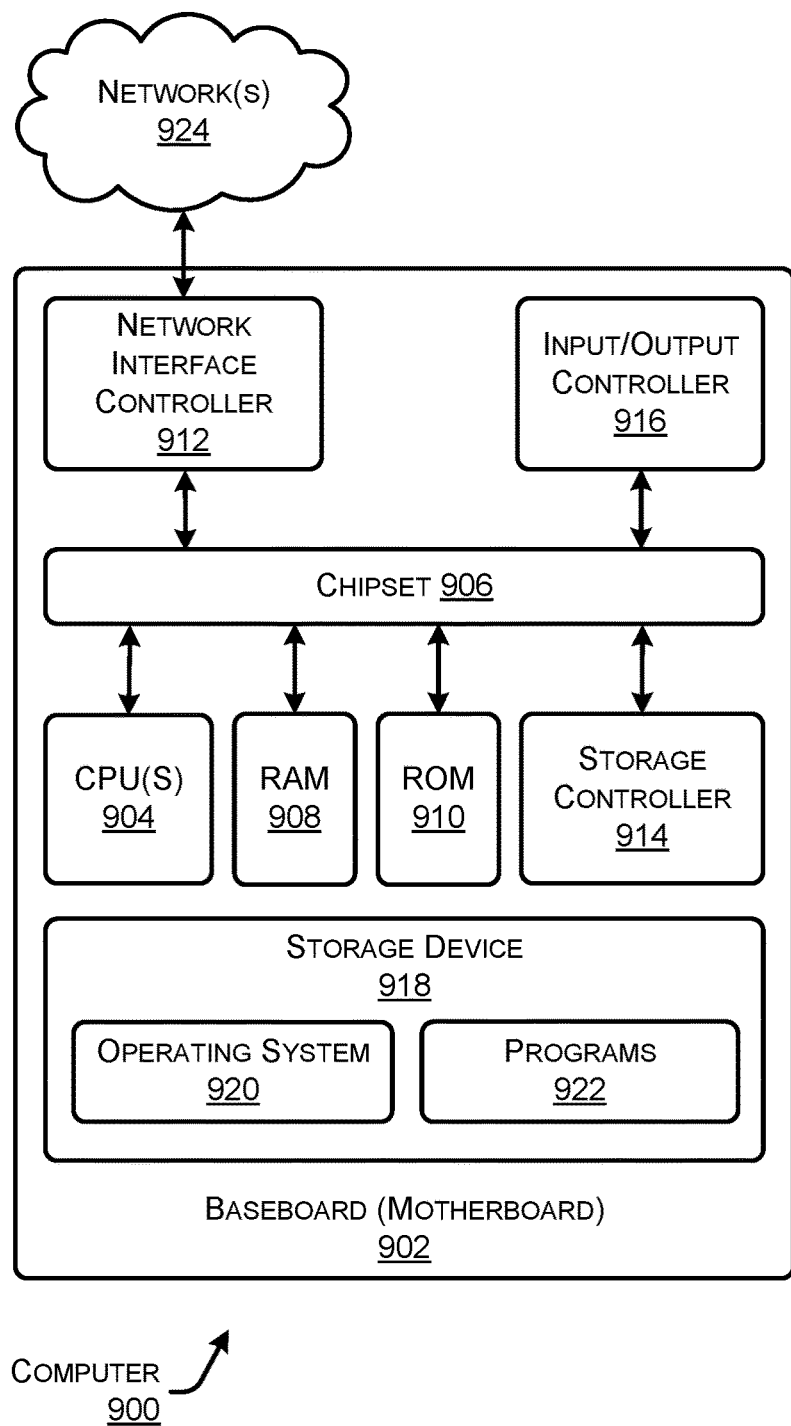
FIG. 9 is a computer architecture diagram illustrating an example computer hardware architecture for implementing an inspection device that can be utilized to implement aspects of the various technologies presented herein.

FIG. 9 is a computer architecture diagram illustrating an example computer hardware architecture for implementing an inspection device that can be utilized to implement aspects of the various technologies presented herein. The computer 900 shown in FIG. 9 illustrates a conventional server computer 802, client device 132, user device 136, workstation, desktop computer, laptop, tablet, network appliance, e-reader, smartphone, and/or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 may operate in a networked environment using logical connections to remote computing devices and computer systems through a network, such as the networks 924. The chipset 906 can include functionality for providing network connectivity through a NIC 912, such as a gigabit Ethernet adapter. The NIC 912 is capable of connecting the computer 900 to other computing devices over the networks 924. It should be appreciated that multiple NICs 912 can be present in the computer 900, connecting the computer to other types of networks and remote computer systems.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the overlay network platform 100, and or any components included therein, may be supported by one or more devices similar to computer 900. Stated otherwise, some or all of the operations performed by the overlay network platform 100, and or any components included therein, may be performed by one or more computer devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 918 can store other system or application programs and data utilized by the computer 900.

In one embodiment, the storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-7. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

The computer 900 may include one or more hardware processors 904 (processors) configured to execute one or more stored instructions. The processor(s) 904 may comprise one or more cores. Further, the computer 900 may include one or more network interfaces configured to provide communications between the computer 900 and other devices, such as the communications described herein as being performed by the various nodes, components, and devices of the overlay network platform 100 and the client devices 132. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 922 may comprise any type of programs or processes to perform the techniques described in this disclosure. For instance, the programs 922 may cause the computer 900 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
provisioning an overlay network, wherein:
each tenant of multiple tenants hosted by a forwarding plane of the overlay network is configured to forward routing packets to a routing control plane of the overlay network, the routing packets indicating respective destinations that are served by each tenant; and
the routing control plane of the overlay network is configured to, based at least in part on receiving the routing packets, determine routing paths between each tenant of the multiple tenants and the respective destinations;
receiving a first routing packet at the routing control plane, the first routing packet sent to the routing control plane by a first tenant of the multiple tenants, the first routing packet including an indication of a first destination that is served by the first tenant;
determining, by the routing control plane and based at least in part on the first routing packet, a routing path between a second tenant of the multiple tenants and the first destination;
generating routing data associated with the routing path; and
storing the routing data in a routing table that is associated with the second tenant and accessible to the second tenant.

2. The method of claim 1, wherein:
the routing table comprises a first routing table of multiple routing tables stored by the routing control plane, and the second tenant is configured to:
read the routing data from the first routing table; and
update a second routing table to include the routing data, the second routing table stored locally by the second tenant.

3. The method of claim 2, wherein the second tenant is configured to send traffic along the routing path and to the first destination based at least in part on updating the second routing table to include the routing data.

4. The method of claim 1, wherein the routing table comprises a first routing table and the routing control plane includes a key-value store that is configured to store multiple routing tables, the multiple routing tables including at least the first routing table and a second routing table that is associated with a first tenant and accessible to the first tenant.

5. The method of claim 1, wherein the routing control plane includes a routing daemon that is configured to:
determine the routing paths between each tenant of the multiple tenants and the respective destinations; and
store the routing data in the routing table that is associated with the second tenant and accessible to the second tenant.

6. The method of claim 1, wherein the routing data is first routing data, the routing path is a first routing path, and the routing table is a first routing table, the method further comprising:
receiving a second routing packet at the routing control plane, the second routing packet sent to the routing control plane by the second tenant of the multiple tenants, the second routing packet including an indication of a second destination that is served by the second tenant;
determining, by the routing control plane and based at least in part on the second routing packet, a second routing path between the first tenant and the second destination; and
storing second routing data associated with the second routing path in a second routing table that is associated with the first tenant and accessible to the first tenant.

7. The method of claim 1, further comprising:
receiving the first routing packet at the first tenant;
determining that the first routing packet is a first border gateway protocol (BGP) packet; and
sending the first BGP packet to the routing control plane based at least in part on determining that the first routing packet is the first BGP packet.

8. A system comprising:
one or more processors; and
one or more non-transitory computer-readable media storing instructions that, when executed by the one or more processors, cause the one or more processors to perform operations comprising:
provisioning an overlay network, wherein:
each tenant of multiple tenants hosted by a forwarding plane of the overlay network is configured to send routing packets to a routing control plane of the overlay network, the routing packets indicating respective destinations that are served by each tenant; and
the routing control plane of the overlay network is configured to, based at least in part on receiving the routing packets, determine routing paths between each tenant of the multiple tenants and the respective destinations;
receiving, at a first tenant of the multiple tenants, a routing packet including an indication of a first destination that is served by the first tenant;
forwarding the routing packet to the routing control plane based at least in part on determining that the routing packet includes the indication; and
receiving, at a second tenant of the multiple tenants and from the routing control plane, routing data indicative of at least a portion of a routing path between the second tenant and the first destination.

9. The system of claim 8, the operations further comprising:
receiving, at the second tenant, traffic that is to be sent to the first destination; and
based at least in part on the routing data, sending the traffic to the first destination using the routing path.

10. The system of claim 8, wherein forwarding the routing packet to the routing control plane comprises forwarding the routing packet to a routing daemon of the routing control plane.

11. The system of claim 10, wherein the routing daemon is configured to:
determine the routing paths between each tenant of the multiple tenants and the respective destinations; and
store the routing data associated with the routing path in a key-value store of the routing control plane that is accessible to each tenant of the multiple tenants.

12. The system of claim 8, wherein receiving the routing data associated with the routing path from the routing control plane comprises:
determining that a first routing table stored by a key-value store of the routing control plane has been updated to include the routing data, the first routing table being associated with the second tenant; and
updating a second routing table to include the routing data, the second routing table stored locally by the second tenant.

13. The system of claim 12, wherein determining that the first routing table stored by the key-value store has been updated comprises determining, by a key-value agent running on the second tenant, that the first routing table has been updated.

14. The system of claim 8, the operations further comprising determining, by the first tenant, that the routing packet is a border gateway protocol (BGP) packet, wherein forwarding the routing packet to the routing control plane is further based at least in part on determining that the routing packet is the BGP packet.

15. The system of claim 8, wherein the routing packet is a first routing packet, the routing path is a first routing path, and the routing data is first routing data, the operations further comprising:
receiving, at the second tenant of the multiple tenants, a second a routing packet including an indication of a second destination that is served by the second tenant;
forwarding the second routing packet to the routing control plane; and
receiving, at the first tenant and from the routing control plane, second routing data indicative of at least a portion of a second routing path between the first tenant and the second destination.

* * * * *